United States Patent [19]

Cugini

[11] 3,824,388
[45] July 16, 1974

[54] HYDROCARBON CRACKING SYSTEM

[76] Inventor: John C. Cugini, 9 Penlaw Rd., Lawrenceville, N.J. 08648

[22] Filed: June 26, 1972

[21] Appl. No.: 266,208

[52] U.S. Cl............. 235/151.12, 208/DIG. 1, 444/1, 260/683 R
[51] Int. Cl.......................................... G06f 15/46
[58] Field of Search ........ 235/151.12, 150.1; 444/1; 208/DIG. 1, 46, 48, 106, 130, 132; 260/683 R

[56] References Cited
UNITED STATES PATENTS

| | | | |
|---|---|---|---|
| 3,352,920 | 11/1967 | Kitzen............................ | 208/130 X |
| 3,437,714 | 4/1969 | Newman......................... | 208/132 X |
| 3,579,601 | 5/1971 | Kiulen.............................. | 260/683 |
| 3,580,959 | 5/1971 | Dorner............................ | 208/132 X |
| 3,617,512 | 11/1971 | Bryson et al..................... | 208/130 X |

Primary Examiner—Joseph F. Ruggiero

[57] ABSTRACT

Operation of a hydrocarbon cracking furnace is controlled automatically by utilizing various types of equipment to control the flow to the furnace of hydrocarbon feed gas, a mixing gas such as steam, and furnace fuel in such manner as to increase the yield of desirable cracked products while simultaneously operating the furnace closer to its limiting conditions and increasing the amount of furnace on-line time. This is accomplished by monitoring numerous furnace operating parameters to provide data which is used to automatically control equipment which results in controlling the furnace outlet gas velocity in a predetermined desired manner. The system provides for automatic control of furnace outlet gas velocity by controlling the flow of any one or more of the hydrocarbon feed gas, the mixing gas such as steam, or the furnace fuel in an automatically controlled sequence of operations. Equipment and operator-set limiting conditions are imposed on the system and the latter can be changed as desired.

33 Claims, 15 Drawing Figures

FIG. 4
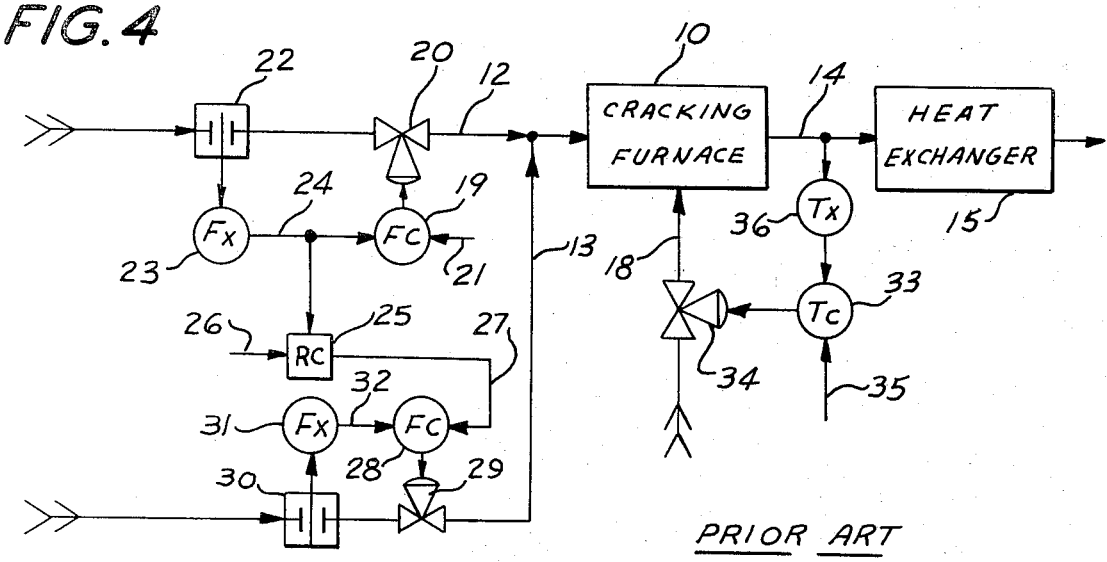
PRIOR ART
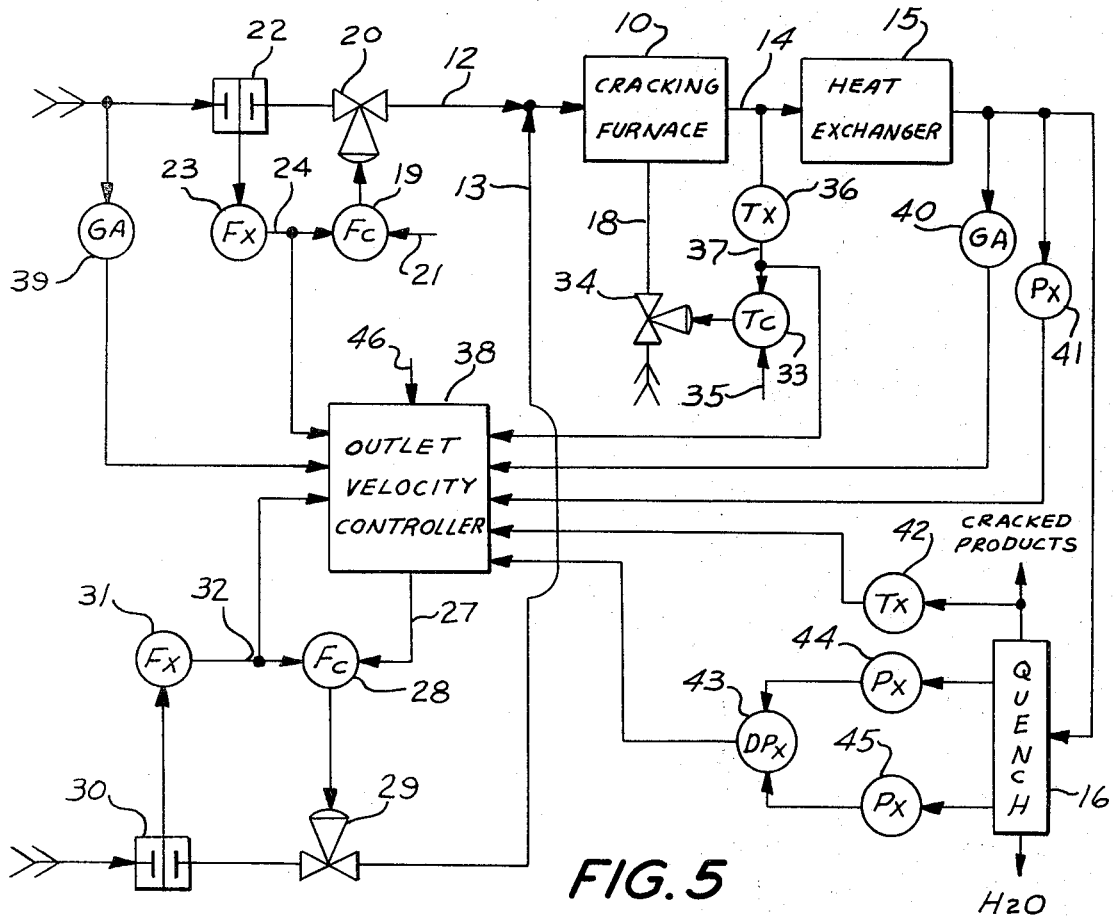
FIG. 5

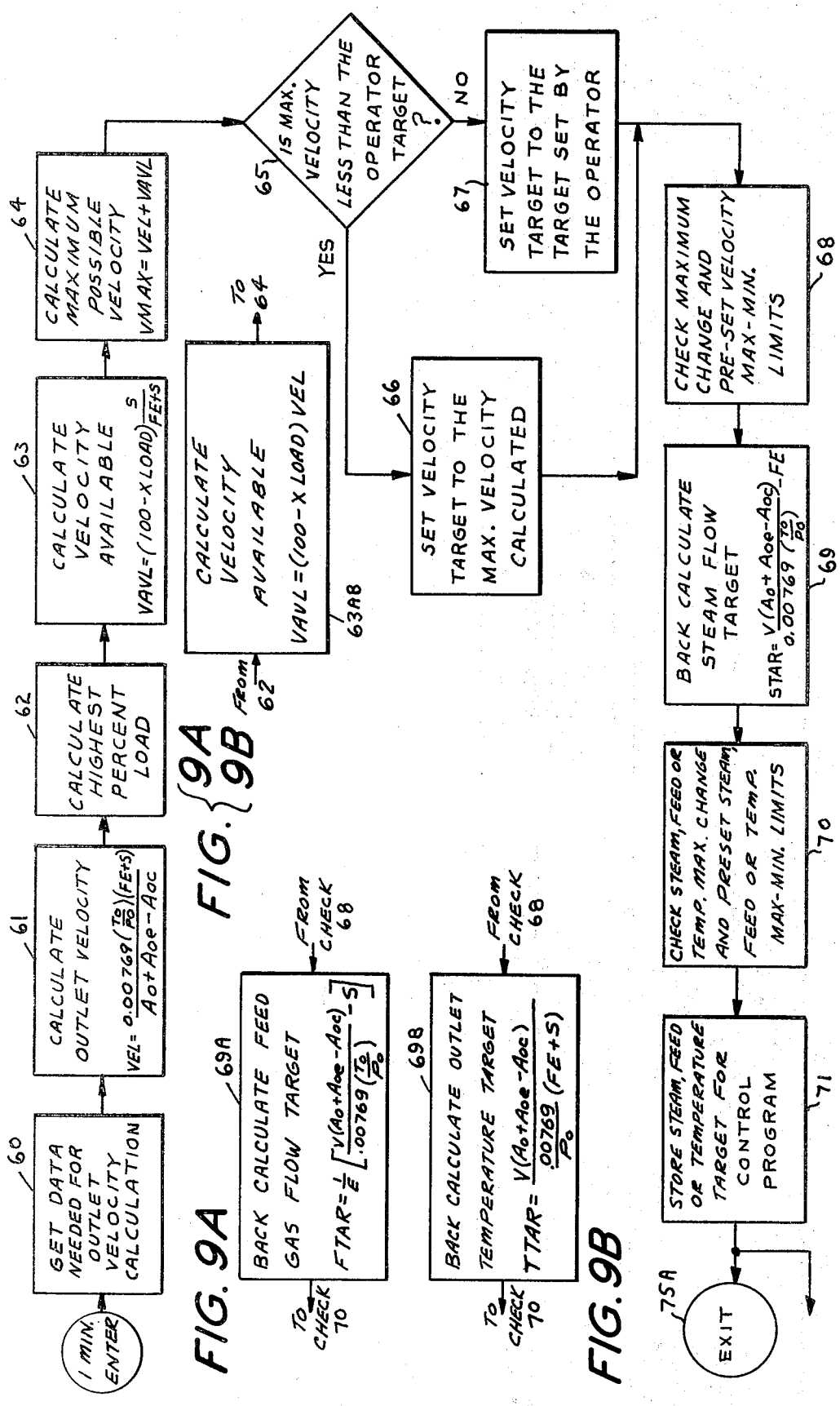

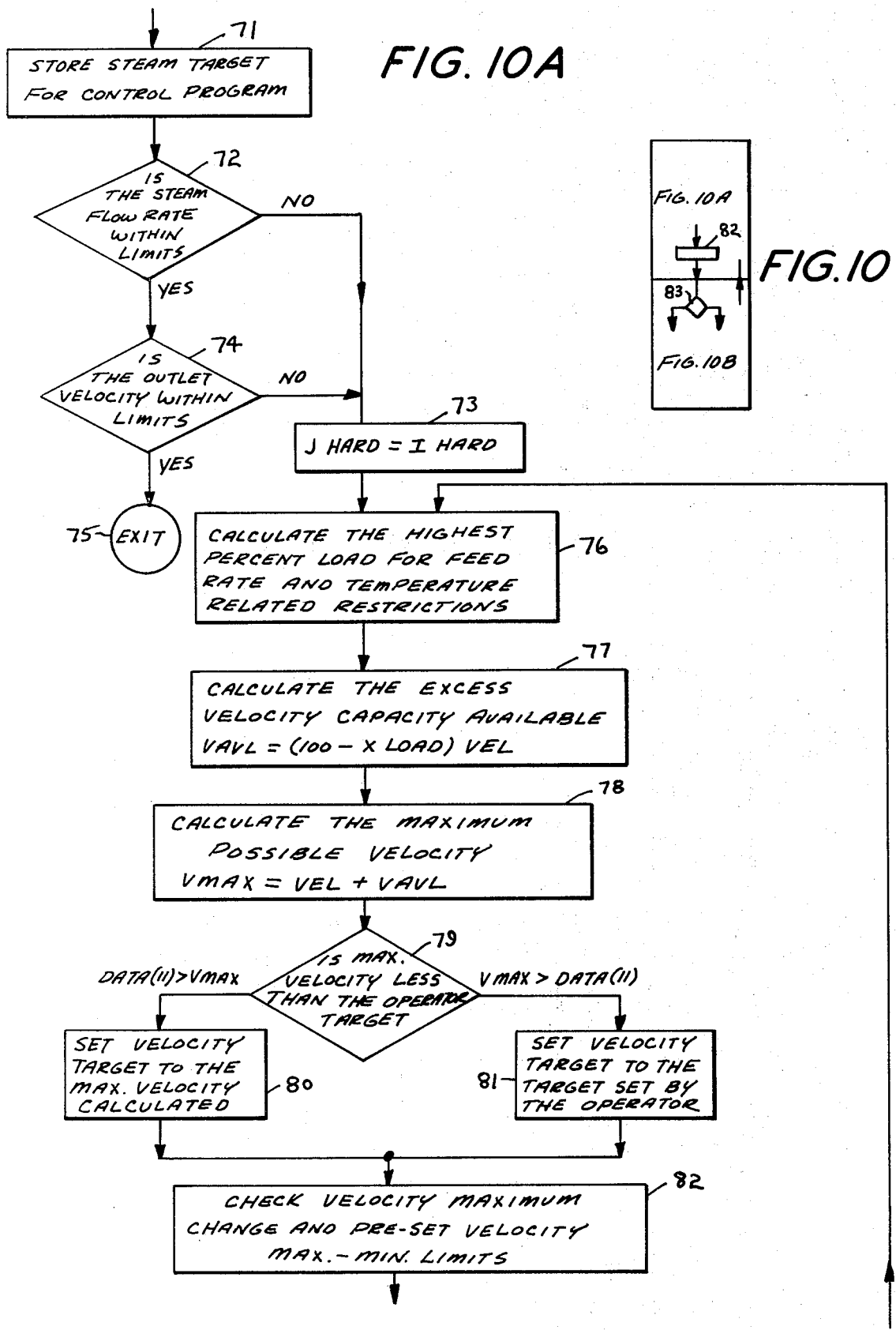

HYDROCARBON CRACKING SYSTEM

This invention relates to apparatus for and a method of controlling tubular type cracking furnaces utilized in the manufacture of desired gaseous hydrocarbons such as ethylene, and will be illustrated in conjunction with the ethylene manufacturing process. The tubular furnace is the heart of the ethylene manufacturing process and consequently its performance carries the burden of the major profit potential of the entire process operation. The control system according to the invention greatly improves tubular furnace control, and thus furnace performance.

Normally, natural gas such as ethane and/or propane is fed into the cracking furnace. Within the furnace the feed gas is converted to a gaseous mixture mainly containing hydrogen, methane, ethylene, propylene, butadiene and small amounts of heavier gases. At the furnace exit this mixture is cooled, allowing removal of most of the heavier gases, and compressed.

The remaining mixture is routed through various distillation columns where the individual components such as ethylene are purified and separated. The separated products, of which ethylene is the major product, then leave the ethylene plant to be used in numerous other processes for the manufacture of a wide variety of secondary products.

The present invention is directed to that part of the total process just described which is carried out by the cracking furnace, and the economic considerations involved such as maximization of the quantity of desired cracked products, and furnace on-line time. In the cracking process the feed gas is mixed with steam and fed into the tube of the cracking furnace. Normal plant design provides about ten parallel cracking furnaces. Within the furnace, heat is supplied to the outside of the tube by the conbustion of fuel. As the feed gas increases its temperature by traveling through the tube, an energy level sufficient to break the bonds of the feed gas molecule is reached. These broken molecule pieces combine, re-break, re-combine, on so on, until the gas leaves the furnace and is cooled in a transfer line heat exchanger. The heat exchanger removes the heat from the gas by transferring it to water to produce steam. Prior to the use of heat exchangers, the furnace outlet temperature was reduced by direct contact with water called "water quench." The heat exchanger came into being due to the large economic advantage of heat recovery.

Cooling causes the reaction to stop. At this point the feed gas of ethane and/or propane has become a mixture of new gases — hydrogen, methane, ethylene, propylene, etc., with some remaining amount of the original feed gas. The amounts of the individual components within the gaseous mixture leaving the furnace can be varied by manipulating various parameters which include conversion, residence time and hydrocarbon partial pressure, all of which are discussed more fully hereinafter.

A necessary evil as the result of the furnace cracking operation is the formation of "coke", semi-pure carbon that has the appearance of dark graphite. The amount of coke formed in the furnace is a function of the length of time, known as "residence time", that the feed gas is in the cracking tube undergoing reaction. This coke adheres to the inner walls of the furnace cracking tube and transfer line heat exchanger, and additionally accumulates in the entrance head of the heat exchanger. Coke buildup eventually causes the furnace's removal from service by plugging the furnace or heat exchanger tubes. The average length of time for this plugging to occur with conventional cracking techniques is generally 20 to 30 days. The coke is removed by placing the furnace in a special operation where a mixture of air and steam is fed through the furnace tube at near operating temperature. The hot air causes the coke to burn thus effecting its removal. The transfer line heat exchanger is cleaned of coke manually as a separate operation.

In the apparatus disclosed herein embodying the invention the coke formation is reduced by minimizing residence time. This is achieved by making it possible to safely increase the outlet gas velocity by increasing the through-put or input rate of hydrocarbon feed gas. In a standard cracking furnace operation the maximum feed gas input is held at a level lower than the theoretical maximum level of which the system is capable because the present control systems premit large amplitude velocity oscillations about the average value. Since the peak conditions cannot be permitted to exceed the maximum safe limits, the average condition must be reduced. The system according to the invention reduces the amplitude oscillations through automatic control of the input steam and/or hydrocarbon gas feed rates so that the average input rate of steam and/or feed gas can be increased. This increases outlet gas velocity and minimizes residence time, which reduces coke formation.

For example, one of the major variables that affects the outlet velocity is the composition of the hydrocarbon gas entering the cracking tube, that is, the relative quantity of ethane and propane. If the percent propane in the feed gas increases, the outlet velocity will increase. Under present control procedures this continues to occur until the operator compensates for this change manually by lowering the feed volume or the outlet temperature set point. With the invention, this compensation occurs automatically by varying the steam volume, feed volume or outlet temperature to hold the outlet velocity at a more constant level.

With the outlet velocity under control as described, it is possible to increase the average outlet velocity without violating the maximum allowable outlet velocity limits by increasing either the conversion rate, the hydrocarbon feed rate or the steam rate.

The down time required for de-coking and/or tube repair of the furnace and heat exchanger is an obvious economic liability, and accordingly, it is a primary object of the invention to provide a novel control system for cracking furnaces which increases the length of on-line time substantially beyond that achievable with presently utilized techniques by minimizing the rate of coke build-up in the cracking tube and heat exchanger. This results from minimizing residence time through increasing the outlet velocity.

Yet another object of the invention is to provide a novel control system for cracking furnaces as aforesaid which by controlling the rate of change of flow velocity in the system minimizes the flaking off of already formed coke from the cracking tube walls which by movement therethrough causes abrading by what may be called coke blasting, to thereby minimize the need for replacement of the cracking tube.

Another object of the invention is to provide a novel control system for cracking furnaces as aforesaid which provides the ability to increase the throughput of the hydrocarbon gas in situations where the outlet velocity is the limiting factor by providing a close control over outlet velocity.

Still another object of the invention is to provide a novel control system for cracking furnaces as aforesaid which while minimizing coking, at the same time maximizes the yield of ethylene by holding the amount of steam in the hydrocarbon gas-steam mixture at a maximum thereby reducing the hydrocarbon partial pressure.

The foregoing and other objects of the invention will become clear from a reading of the following specification in conjunction with an examination of the appended drawings, wherein:

FIG. 4 is a schematic diagram of a typical prior art cracking furnace instrumentation arrangement;

FIG. 5 is a schematic diagram of the novel system of cracking furnace control according to the invention utilizing programmed automatic steam flow control only;

FIGS. 9, 9A, 9B and 10, 10A and 10B are flow charts depicting the sequence of operations carried out in implementing the control system according to the invention.

In the several figures, like elements are denoted by like reference characters.

Figure 1:
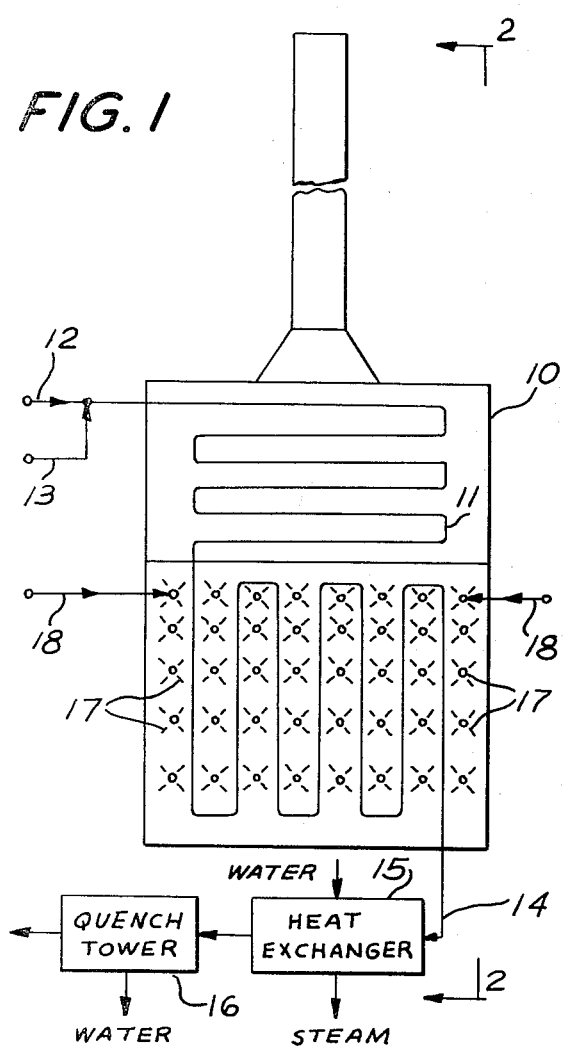
FIG. 1 is a schematic view of a tubular cracking furnace system with the furnace itself shown in vertical section.
Figure 2:
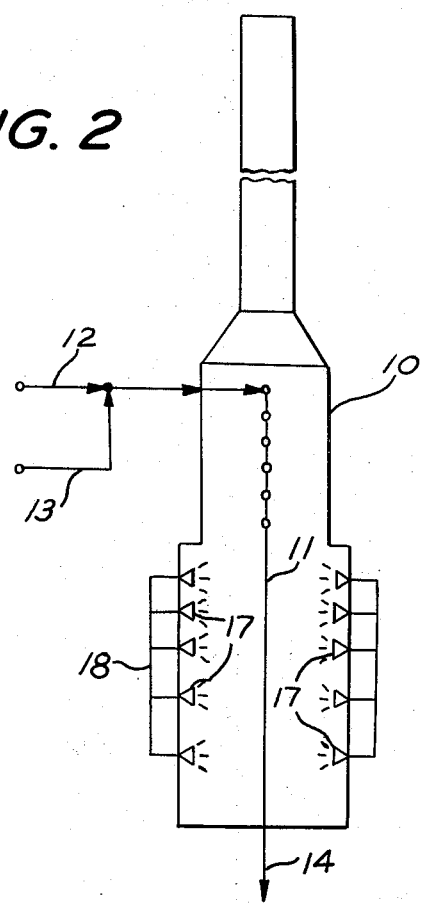
FIG. 2 is a vertical sectional view of the schematically shown cracking furnace of FIG. 1 as would be seen when viewed along line 2—2 of FIG. 1.

Referring first to FIGS. 1 and 2, there is seen a conventional cracking system having a cracking furnace designated generally as 10 within which is convoluted a cracking tube 11 fed at its inlet with a mixture of feed gas and steam from inlet lines 12 and 13 respectively, and in which the cracking tube 11 is connected at its outlet 14 to a transfer line heat exchanger 15 which, as previously described, removes heat from the outlet gases to stop the cracking reaction and utilizes the removed heat to produce from any appropriate water supply steam for general use. The outlet gases from the heat exchanger 15 are fed into quench tower 16. These gases contain residual steam which is condensed out of and removed from the cracked gases before the latter exit from the quench tower.

Within the furnace 10 are a multiplicity of heaters such as fuel burners 17 manifolded from fuel supply lines 18, these heaters being so arranged and controlled within the furnace as to heat the cracking tube to the desired temperature for the cracking process.

Before discussing the conventional type of furnace control that is characteristic of the prior art and the improved novel system according to the invention, it will be conductive to a more complete understanding of the nature of the problem to first briefly discuss the concepts of conversion, partial pressure and residence time, and their inter-relationships.

Considering first conversion or conversion rate, the amount of feed gas remaining in the furnace outlet can in some instances be used to describe the conversion rate of the cracking reaction. In these instances conversion is defined as the precentage disappearance of feed gas. For example, if twenty pounds of ethane remain in the outlet of an ethane furnace being fed one hundred pounds, the conversion is eighty percent. At different conversion rates, the amounts of the individual gases leaving the furnace varies.

Figure 3:
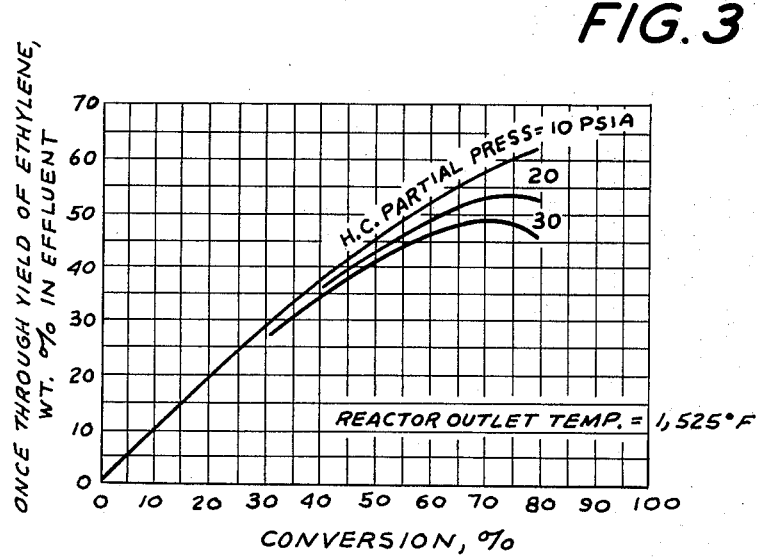
FIG. 3 is a graph showing the effect of conversion and hydrocarbon partial pressure on the once-through yield of ethylene.

In theory, conversion is related to two things: the length of time the feed gas is undergoing reaction, called residence time, and the temperature at which the reaction is taking place. This is mathematically expressed as:

$$K\theta = \log_e [1/(1-a)]$$

where $K$ = disappearance reaction velocity constant. $\sec^{-1}$, evaluated at the reaction temperature.
$\theta$ = residence time, secs.
$a$ = fractional conversion Additionally, conversion is affected by hydrocarbon partial pressure which is mainly the result of the amount of steam present and the total pressure. Increases in steam content for a given amount of feed gas and cracked products which are present decreases the pressure on the hydrocarbon molecules present, thereby resulting in reduced partial pressure. Lowering partial pressure results in higher yields of the more desirable cracked components such as ethylene. This is true within specific conversion limits and is shown for ethane cracking in FIG. 3 of the drawings, from which it is observed that substantial increases in ethylene yield are obtained by reducing partial pressure in the normally encountered 60 percent to 75 percent conversion range.

The theory of conversion as stated above indicates that as residence time increases, the reaction temperature decreases for the same conversion. This theory had in the past led furnace designers in the direction of lengthening residence time rather than increasing temperature for the same conversion because of materials temperature limitations and the expense of the materials from which the furnace is constructed. The result of long residence time is an increase in the formation of coke. This became evident to furnace designers with the advent of transfer line heat exchangers. Where coke formation was not readily seen in water quench type furnaces, the replacement of water quench with a heat exchanger provided an ideal collector for the coke. The coke manifested itself strongly by plugging the heat exchanger tubes and requiring shut down of the furnace for decoking. Consequently, coking is minimized by minimizing residence time, and it is to this end that the present invention is directed.

Residence time is calculated as the reaction zone length divided by the average actual velocity. The reaction zone length is defined as the cracking tube length between the points at which the reaction begins and ends, the tube length being compensated for the metal coefficient of expansion at the operating temperature. The beginning of the reaction is assumed at a constant temperature, and it is also assumed that the temperature rise per foot of tube in this area is constant. These two constants are then used in reference to a measured temperature in this area to locate the compensated initial reaction point. The point where the reaction ends is taken at the entry to the transfer line heat exchanger.

The gas velocity of feed gas and steam is calculated at the point in the cracking tube where reaction begins and at the outlet of the cracking tube. An average is then calcualted and termed the average actual velocity. The gas velocity where cracking begins, and the outlet gas velocity, are arrived at by knowing the measured inlet orifice flows and compensating these with temperature, pressure and in the case of the feed gas, the change in volume due to reaction. Both gas velocities are compensated for the metal coefficient of expansion and the buildup of coke through the furnace run life. Coke buildup is treated as a linear daily rate based on the actual experience of a particular furnace.

The above description of the calculation of residence time is shown mathematically as follows:

$$\theta = \frac{260 A_c L_c}{\frac{1752}{Pic}(F+S) + \frac{To}{Po}(FE+S)}$$

Where
$\theta$ = Residence Time, secs.
$Ac$ = Corrected Average Tube Area, Sq.Ft.
= $(Ai + \Delta Aie + Ao + \Delta Aoe - \Delta Aoc)/2$
Where
$Ai$ = Measured Inlet Area at 70°F, sq.ft.
$\Delta Aie$ = Change in Inlet Area due to Expansion, sq.ft.

$Ao$ = Measured Outlet Area at 70°F, sq.ft.
$\Delta Aoe$ = Change in Outlet Area due to Expansion, sq.ft.
$\Delta Aoc$ = Change in Outlet Area due to Coke Buildup—Taken as a Daily Linear Rate, sq. ft.
$Lc$ = Corrected Radiant Tube Length, ft.
= $L + \Delta Le - (1752 - Ti)/2.8$
Where
$\Delta Le$ = Change in Measured Length at 70°F due to Average Operating Temp.; Coeff. of Expansion = $10.1 \times 10^{-6}$In/In-°F
$Ti$ = Measured Convection Outlet Temp. °R
$L$ = Measured Radiant Tube Length at 70°F — Measured from Convection Temp. to Heat Exchanger $Pic$ = Initial Cracking Pres. PSIA
= $(LT - Lc)[(Po - Pi)/LT] + Pi$
Where
$LT$ = Total Measured Tube Length from Furnace Inlet to Outlet plus Correction for Expansion, ft.
$Po$ = Furnace Outlet Pres., PSIA
$Pi$ = Furnace Inlet Pres., PSIA
$F$ = Feed Rate, MCFH
$S$ = Steam Rate, MCFH $To$ = Outlet Gas Temperature, °R
$E$ = Expansion Factor
= $MWo/MWi$
Where
$MWo$ = Molecular Weight of Outlet
$MWi$ = Molecular Weight of Feed In summary, the residence time of the feed gas in the cracking tube is a function of five variables:
1. Tube expansion
2. Coke buildup
3. Point where cracking begins
4. Gas velocity where cracking begins
5. Outlet gas velocity In attempting to control the numerous variables described above, the arrangement of normal instrumentation for a present day cracking furnace is shown in FIG. 4. Flow through the feed gas inlet line 12 is established by the flow controller 19 through valve 20 as determined by an operator set input 21. This establishes the load on the furnace. The feed gas flow is monitored by an orifice 22 and flow transmitter 23 which latter produces a signal on its output line 24. This signal is transmitted to flow controller 19 and to a ratio controller 25. The flow controller 19 adjusts the valve 20 until the flow transmitter 23 signals that the flow corresponds to the operator set input condition.

The ratio of feed gas to steam is controlled by the ratio control 25 in accordance with an operator set input 26 and the feed gas flow signal received from flow transmitter 23. A signal is produced on ratio control output line 27 which constitutes a set point for steam flow controller 28 controlling valve 29. Steam flow is monitored by an orifice 30 and flow transmitter 31 which latter produces a signal on its output line 32 and transmits such signal to flow controller 28 to cause the controller to adjust valve 29 until the steam flow corresponds to the set point established by ratio control 25.

A similar arrangement is utilized at the furnace outlet for controlling the conversion rate by controlling the firing of the furnace burners by means of fuel flow control through fuel supply line 18. Fuel flow is established by a temperature controller 33 controlling flow valve 34 as determined by an operator set input 35. The furnace outlet temperature is monitored by temperature transmitter 36 which produces a signal on its output line 37 that is transmitted to temperature controller 33. The temperature controller 33 adjusts valve 34 until the temperature transmitter 36 signals that the furnace outlet line gas temperature corresponds to the operator set input condition. Some furnaces utilize a gas analyzer after the transfer line heat exchanger 15 in FIG. 4 to more accurately determine the degree of conversion. The operator uses this information to re-adjust the outlet temperature controller. With these conventional controls, the operator has the personal responsibility of maintaining the proper operating conditions and obtaining the maximum performance.

With ratio control, a decrease (or increase) in feed gas flow causes a proportional decrease (or increase) in steam flow to maintain a constant ratio of feed gas to steam. Ratio control, where the steam flow changes in direct proporation to the feed flow, has a number of undesirable aspects. For example, the decreased feed gas flow situation results in an increase in residence time by decreasing the velocity, which brings about an increase in the rate of coke formation. The fact that the steam flow is decreased as well causes the residence time to be even longer. When the feed gas is increased under ratio control, sufficient steam capacity must be available to increase the steam as well. This implies there was steam capacity available prior to making the change that should have been used to decrease the residence time and partial pressure, thereby providing more efficient operation. Therefore, the cracking furnace had to be operating in an inefficient mode to allow the change. Additionally, the change in velocity due either to an increase or decrease in feed flow can cause serious problems. Velocity changes which exceed a certain gradient cause coke which has already formed to flake off of the tube walls and be carried into the transfer line heat exchanger. This flaking is called "spalling". In addition to plugging the heat exchanger, the coke particles in the gas from spalling cause excessive erosion of the furnace tubes, especially at the higher gas velocities. The present ratio control systems exagerate the problem by increasing or decreasing the steam simultaneously, whereas the system according to the invention dampens the gradient changes.

The present invention provides an improvement over conventional furnace control by controlling the outlet gas velocity of a cracking furnace through the manipulation of the feed gas flow, the steam flow, and the outlet temperature, to thereby control and make possible the minimization of, residence time. A satisfactory system for achieving this result by automatically controlling only steam flow to minimize velocity amplitude oscillations is shown schematically in FIG. 5 to which reference should now be made.

It should be noted at the outset that all of the elements of the conventional systems illustrated in FIG. 4 are present in FIG. 5 except that the ratio control 25 has been eliminated, and the ratio control has in a sense been replaced by a function box 38 designated "Outlet Velocity Controller". This outlet velocity controller can take a number of forms, as for example a series of read-out devices or indicators providing data from which calculations to be subsequently described can be made. From these calculations the steam flow controller 28 can be operated to provide the desired result.

However, a much preferrable approach is to utilize a computer to process the data and automatically manipulate the equipment to achieve the desired result. An illustrative sample program in Fortran coding is set forth hereinafter for carrying out the sequence of operations shown in FIGS. 9 and 10 of the drawings for implementing the novel control systems of FIGS. 5 through 8 according to the invention.

As seen in FIG. 5 the signal output lines 24 and 32 from feed gas and steam flow transmitters 23 and 31 respectively are also connected to provide signal input information to the outlet velocity controller 38, and the set point control input line 27 to steam flow controller 28 is also the output line from velocity controller 38. Additional monitoring signals are generated and routed to the outlet velocity controller 38 from input line feed gas analyzer 39, heat exchanger output line gas analyzer 40 and pressure transmitter 41, quench tower top temperature 42, quench tower differential pressure transmitter 43 which derives its data from quench tower top and bottom pressure transmitter 44 and 45.

Finally, an operator set input 46 is provided to insure settable outlet velocity control of the furnace when desired provided that no system safety parameters would be violated.

From the foregoing discussion it should now be clear that furnace loading in the system of FIG. 5 is controlled by operator set point control of the feed gas controller 19, that conversion rate is controlled by operator set point control of the temperature controller 33, and that the outlet velocity controller 38 can then be utilized to safely maximize outlet velocity and automatically hold or vary outlet velocity at its safe maximum level by controlling the rate of steam flow as conditions of feed, temperature and pressure vary in the system.

Figure 6:
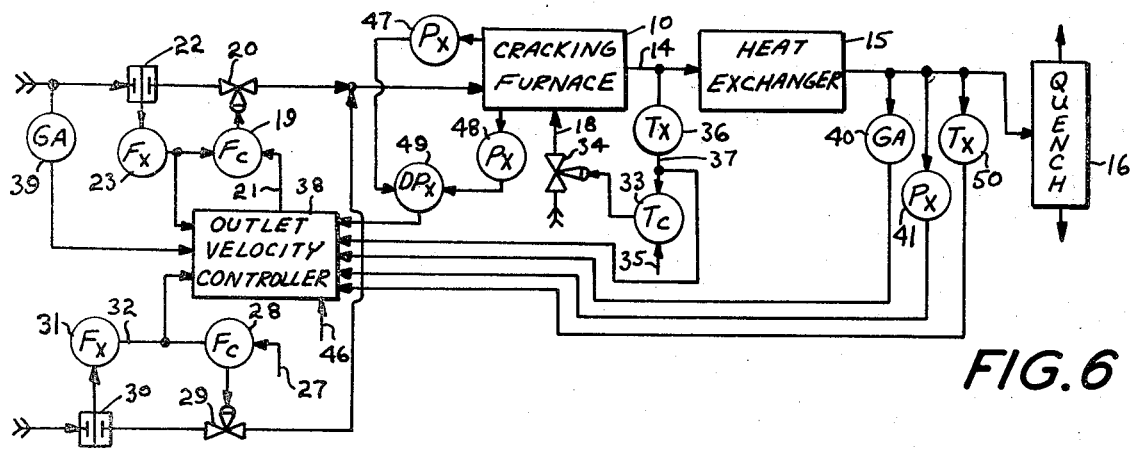
FIG. 6 is a schematic diagram of the novel system of cracking furnace control according to the invention utilizing programmed automatic hydrocarbon feed control only.

A similar system is shown in FIG. 6 in which it is the hydrocarbon feed gas flow rather than steam flow which is controlled by the outlet velocity controller 38, as shown by connection of flow controller 19 set point input line 21 to the outlet velocity controller 38. In this case the set point control input line 27 to steam flow controller 28 becomes an operator controlled input. The quench tower temperature and pressure conditions monitored in the system shown in FIG. 5 are not relevant to a determination of feed gas flow conditions and are therefore omitted in the showing of FIG. 6. However, other conditions are important and must be monitored, these conditions being the furnace stack draft measured by pressure transmitters 47 and 48 and differential pressure transmitter 49, and the transfer line heat exchanger outlet temperature measured by temperature transmitter 50.

Figure 7:
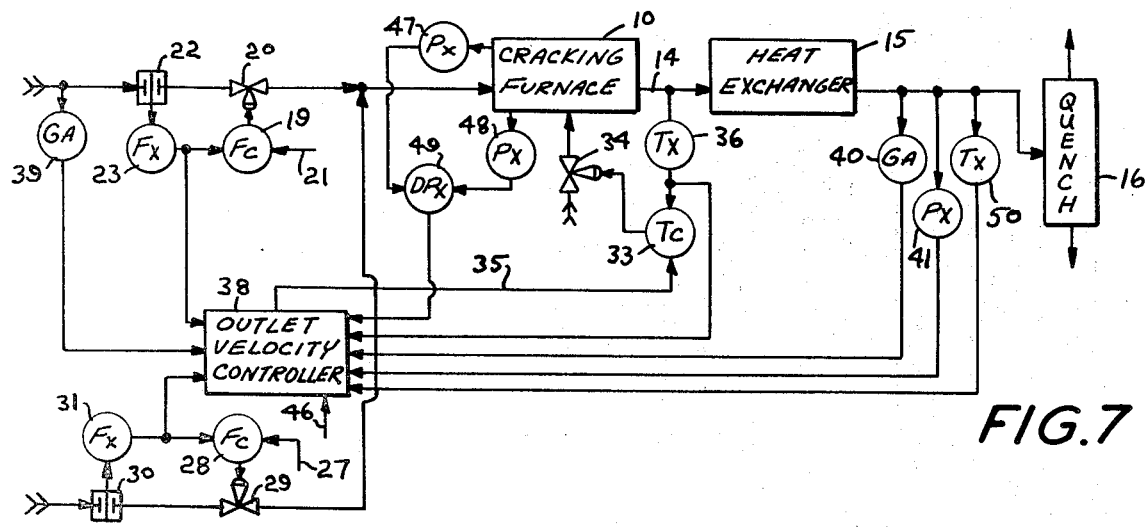
FIG. 7 is a schematic diagram of the novel system of cracking furnace control according to the invention utilizing programmed automatic outlet temperature control only.

FIG. 7 illustrates a system in which the outlet velocity controller 38 controls outlet temperature by connection of its output control line to the set point input line 35 of outlet temperature controller 33, with the set point input lines 21 and 27 of flow controllers 19 and 28 being operator set. As shown in FIG. 7, the monitored system conditions are the same as those for the system of FIG. 6 previously described.

Figure 8:
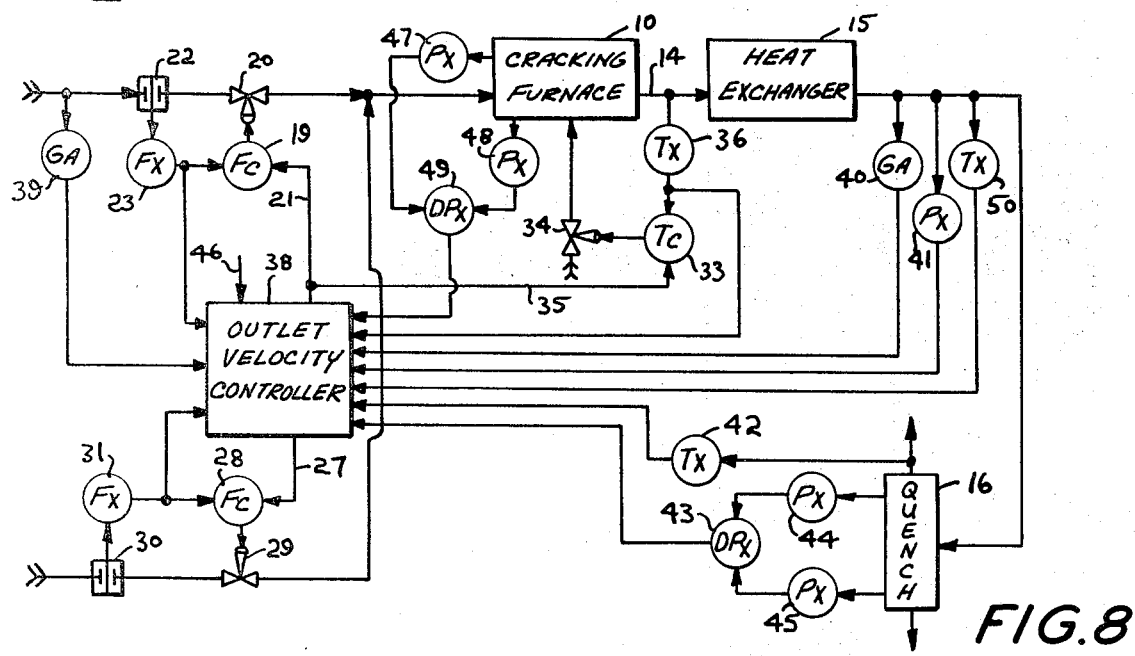
FIG. 8 is a schematic diagram of the novel system of cracking furnace control according to the invention utilizing programmed automatic control of all three parameters steam, hydrocarbon feed and outlet temperature.

FIG. 8 illustrates a system which is a composite of the systems of FIGS. 5, 6 and 7, and which provides automatic control of outlet velocity by controlling steam flow, hydrocarbon feed flow and outlet temperature in a predetermined sequence as will become clear hereinafter. In this system the outlet velocity controller 38 controls steam, hydrocarbon feed and outlet temperature by connection of its output control line to the set point input lines 27, 21 and 35 of steam controller 28, hydrocarbon feed controller 19 and outlet temperature controller 33 respectively. Manual overides (not shown) may be used to set initial values of temperature, hydrocarbon and steam feed.

Outlet velocity was chosen as a desirable control point since it is possible to determine the velocity at this point and because a better combination of all previously discussed parameters affecting cracking furnace performance occur under this control. The advantages obtained are:

1. The velocity control point can be established closer to the maximum allowable level as determined by the physical parameters of the system and held more smoothly at this level. This results in a lower residence time which in turn results in less coke formation.
2. Controlling a more constant outlet velocity means that the velocity profile throughout the entire cracking tube is more constant. This results in a lesser tendency for coke that has formed on the tube walls to spall or flake off and eventually plug the heat exchanger. Erosion of the tubes as result of flaking is also lowered.

3. For any feed which is established, controlling closer to the maximum velocity through increased steam flow results in a lower hydrocarbon partial pressure. Under most cases, this results in a higher yield of the more desirable components such as ethylene.

Outlet velocity is calculated as the actual flow rate of feed gas and steam divided by the outlet cross-sectional area. The actual outlet flow rates are arrived at by knowing the measured orifice flows and compensating these with temperature, pressure, and in the case of feed gas, the change in volume due to reaction. The outlet cross-sectional area is compensated for the metal coefficient of expansion and the buildup of coke through the furnace run life. This is treated as a linear daily rate based on the actual experience of a particular furnace.

The above description of the calculation of outlet velocity is shown mathematically as follows:

$$VEL = [0.00769(To/Po)(FE + S)]/(Ao + Aoe - Aoc)$$

Where $VEL$ = Outlet Velocity, ft/sec
$To$ = Outlet Gas Temperature, °R
$Po$ = Furnace Outlet Pressure, PSIA
$F$ = Feed Rate, MCFH
$E$ = Expansion Factor
   = $MWo/MWi$
Where $MWo$ = Molecular Weight of Outlet gas
   $MWi$ = Molecular Weight of Feed gas
$S$ = Steam Rate, MCFH
$Ao$ = Measured Outlet Area at 70°F, sq. ft.
$Aoe$ = Change in Outlet Area due to Expansion, sq. ft.
$Aoc$ = Change in Outlet Area due to Coke Buildup — Taken as a Daily Linear Rate, sq. ft.

The outlet velocity controller 38 always monitors all of the physical restrictions to insure that they are not violated. Typically these restrictions as related to steam would be the position of the motor operated steam valve 29, the maximum and minimum velocity, the quench tower top temperature and quench tower pressure drop. As related to hydrocarbon feed gas and outlet temperature the restrictions would be cracking tube skin temperature, tube hanger temperature, the furnace stack temperature, the transfer line heat exchanger inlet and outlet temperatures, furnace stack draft, and maximum allowable fuel motor valve position.

Functional flow charts of the sequence of steps for carrying out the method according to the invention are shown in FIGS. 9, 9A, 9B and 10 of the drawings. The sequence of steps for the flow charts has been incorporated into a computer program which is set forth hereinafter. The program, which calculates the outlet velocity target for a single coil cracking furnace, has been coded in IBM-1800 PROSPRO language to illustrate the procedure used in implementing velocity control using a process control computer system. The procedure could be implemented on any digital computer with the appropriate interface equipment and utility programs all of which are well known within the industry.

The program is run on a fixed time interval that is primarily dependent on the frequency and extent of raw material composition changes. This time interval is illustratively assumed as one minute, although a considerably shorter interval is possible. It is assumed for illustrative purposes that the operator has chosen an option to control the outlet velocity by first varying the steam. The operator then has the option of varying either hydrocarbon feed or outlet temperature if it is not possible to control outlet velocity by varying steam. After exercising this option if outlet velocity still cannot be controlled, the remaining parameter can be varied.

It is assumed when starting that the process data has been scanned by an analog scanner, converter to the engineering units indicated and stored on the disk storage unit at the locations indicated by variable numbers 1000 through 1012. It is also assumed that the constants and operator supplied data indicated are stored in −2000 through −2003.

The steam target, feed target and temperature target calculated by the velocity control program will be stored at −2004 through −2006. To retrieve data from the disk storage unit in the IBM-1800 system, a "get variable" function (GETV) has been developed by IBM to retrieve data from the disk and store that data in core memory for use by the control program. There are three parameters associated with the GETV function:

IVAR — the disk address of the variable
VAL — the variable data (value)
IND — a validity indicator
  IND < 0, value is unavailable
  IND = 0, value is accepted
  IND > 0, value is questionable The first function to be accomplished by the velocity control program is to use GETV in bringing the data from the disk that is needed by the control program. To do this the disk addresses 1000 through 1012 and −2000 through −2003 are stored in the IDATA array to allow use of two "DO loops" in obtaining the data from the disk. Having stored the addresses in the IDATA array, the program steps through the DO loop ten times (the maximum on the IBM-1800), calling the GETV function each time to obtain the data from disk storage and store the data in the DATA array. See FIG. 9, function box 60.

With all the data necessary transferred from disk to core storage it is possible to calculate the actual outlet velocity of the cracking tube. This is done using the formula indicated and is stored at VEL (function box 61).

The next function to be accomplished is to determine the percent load on the furnace equipment that would be effected by a change in the steam inlet volume to the furnace. Possible factors which could be affected would be the temperature at the top of the quench tower, the quench tower differential pressure, and the steam motor valve position. The quench tower is used to condense the steam leaving the furnace, and the steam motor valve position indicates the availability of steam. The program calculates the percent load on each of these pieces of equipment, and then determines which of the three restrictions is most heavily loaded and stores the percent load on that piece of equipment in XLOAD (function box 62). In calculating the percent load on each piece of equipment it is illustratively assumed that the maximum quench tower top temperature is 115° (XMAX (1)), the maximum steam motor valve position is 95 percent (XMAX (2)), the maximum quench tower differential pressure ΔP is 3 pounds per square inch (PSI) (XMAX (3)).

```
C     THIS PROGRAM CALCULATES THE OUTLET
C     VELOCITY TARGET FOR A SINGLE COIL
C     CRACKING FURNACE.  THE TARGET IS
C     STORED FOR IMPLEMENTATION BY AN
C     OUTPUT PROGRAM UTILIZING A NORMAL
C     CONTROL ALGORITHM.
C
C     ASSUME THAT THE FOLLOWING DATA IS
C     VALID AND CURRENTLY UPDATED ON DISK.
C
C     VAR.NO.                  DESCRIPTION
C
C     1000              QUENCH TOWER TOP TEMP, °F
C     1001              STEAM MOTOR VALVE POSITION
C     1002              QUENCH TOWER Δ P, PSI
C     1003              OUTLET GAS TEMP.(Tb) °Rankin = °F + 459.
C     1004              OUTLET PRES.(Pb) PSIA
C     1005              FEED RATE, MCFH (Actual) (F)
C     1006              STEAM RATE, MCFH (Actual) (S)
C     1007              TUBE SKIN TEMPERATURE, °F
C     1008              TUBE HANGER TEMPERATURE, °F
C     1009              STACK TEMPERATURE, °F
C     1010              STACK DRAFT
C     1011              TRANSFER LINE HEAT EXCHANGER OUTLET
C                       TEMPERATURE, °F
C     1012              FUEL MOTOR VALVE POSITION
C     -2000             CONSTANT OF .00769
C     -2001             EXPANSION FACTOR (E)
C     -2002             OUTLET AREA CORRECTED FOR EXPANSION
C                       AND COKE (Ao+Aoe-Aoc)
C     -2003             OPERATOR SET VELOCITY TARGET
C     -2004             CALCULATED STEAM TARGET (Desired)
C     -2005             CALCULATED FEED TARGET (Desired)
C     -2006             CALCULATED TEMP. TARGET (Desired)
C     IDATA =           AN INTEGER ARRAY CONTAINING THE ABOVE
C                       VARIABLE NUMBERS.
C     DATA =            A REAL ARRAY CONTAINING THE VALUES
C                       OF THESE VAR. NOS.
C     XMAX(1) =         MAX. ALLOWABLE QUENCH TOWER TOP TEMP.
C     XMAX(2) =         MAX. ALLOWABLE STEAM MOTOR VALVE POSITION
C     XMAX(3) =         MAX. ALLOWABLE QUENCH TOWER Δ P
C     XMAX(4) =         MAX. ALLOWABLE TUBE SKIN TEMP., °F
C     XMAX(5) =         MAX. ALLOWABLE TUBE HANGER TEMP., °F
C     XMAX(6) =         MAX. ALLOWABLE STACK TEMP., °F
C     XMAX(7) =         MAX. ALLOWABLE STACK DRAFT
C     XMAX(8) =         MAX. ALLOWABLE TRANSFER LINE
C                       HEAT EXCHANGER OUTLET TEMP., °F
C     XMAX(9) =         MAX. ALLOWABLE FUEL MOTOR VALVE POSITION
C     IHARD=o           TEMP. HARD

DIMENSION IDATA (17), DATA (17), XMAX (9)

IDATA (1) = 1000
      IDATA (2) = 1001
      IDATA (3) = 1002
      IDATA (4) = 1003
      IDATA (5) = 1004
      IDATA (6) = 1005
      IDATA (7) = 1006
      IDATA (8) = -2000
```

```
              IDATA (9) = -2001
              IDATA (10)= -2002
              IDATA (11)= -2003
              IDATA (12)= 1007
              IDATA (13)= 1008
              IDATA (14)= 1009
              IDATA (15)= 1010
              IDATA (16)= 1011
              IDATA (17)= 1012
C      GET DATA
C
              DO 5 I = 1, 10
              IVAR = IDATA (I)
              CALL GETV (IVAR, VAL, IND)
              DATA (I) = VAL
5             CONTINUE
              DO 7 I=11,17
              IVAR = IDATA (I)
              CALL GETV (IVAR, VAL, IND)
              DATA (I) = VAL
7             CONTINUE
C      CALC VELOCITY
C
              VEL = (DATA (8) * (DATA (4)/DATA (5)) * (DATA (6)*
             1DATA (9) + DATA (7))) / DATA (10)
C
C      CALC HIGHEST %o LOAD STEAM RELATED RESTRICTIONS
C
              XMAX (1) = 115.
              XMAX (2) =  95.
              XMAX (3) =   3.
              XLOAD = DATA (1) /XMAX (1) * 100.0
              DO 20 I = 2,3
              TEMP = DATA (I)/XMAX (I) * 100.0
              IF (XLOAD - TEMP) 10, 20, 20
10            XLOAD = TEMP
20            CONTINUE
C
C      CALC VELOCITY AVAILABLE
              VAVL=(100-XLOAD) * DATA (7) / (DATA (6) * DATA (9) + DATA (7))
C
C      CALC MAX VELOCITY
              VMAX = VEL + VAVL
C      CALC VELOCITY TARGET
C
              IF (VMAX - DATA (11)) 35,30,30
30            VTAR = DATA (11)
              GO TO 40
35            VTAR = VMAX
C      CALL A SUBROUTINE TO LIMIT THE VELOCITY MAX CHANGE
C      AND TO CHECK THAT PRE-SET VELOCITY MAX-MIN
C      LIMITS ARE NOT VIOLATED
40            IVAR = 1
              CALL CHECK (IVAR, VTAR, FLAG)
              VFLAG = FLAG
C      BACKCALCULATE STEAM FLOW TARGET
              STAR = VTAR * DATA (10) / (DATA (8) * (DATA (4)/DATA (5))) -
             1DATA (6) *DATA (9)
C
C      CALL A SUBROUTINE TO LIMIT THE STEAM RATE MAX CHANGE
```

```
C         AND TO CHECK THAT PRE-SET STEAM RATE MAX-MIN
C         LIMITS ARE NOT VIOLATED
          IVAR = 2
          CALL CHECK (IVAR, STAR, FLAG)
          SFLAG = FLAG
C         STORE STEAM RATE TARGET
          IND =0
          CALL PUTV (-2004, STAR, IND)
          IF (SFLAG-1) 42,46,46
42        IF (VFLAG-1) 93,46,46
C
C         VARY FEED OR TEMPERATURE TO CONTROL OUTLET VELOCITY
46        JHARD = IHARD
54        XLOAD = DATA (12)/XMAX (4) * 100.0
          DO 53 I-5,9
          J=8 + I
          TEMP = DATA (J) /XMAX (I) * 100.0
          IF (XLOAD-TEMP) 52,53,53
52        XLOAD=TEMP
53        CONTINUE
C
C         CALC VELOCITY AVAILABLE
C
55        VAVL = (100.-XLOAD) * VEL
C
C         CALC MAX. VELOCITY
          VMAX = VEL + VAVL
C         CALC VELOCITY TARGET
57        IF (VMAX-DATA (11)) 59,58,58
58        VTAR = DATA (11)
          GO TO 60
59        VTAR =VMAX
C
C
60        IVAR = 1
          CALL CHECK (IVAR, VTAR, FLAG)
          IF (JHARD) 68,61,68
C
C         BACK CALCULATE FEED TARGET
61        FTAR = (VTAR*DATA(10)/(DATA(8)*DATA(4)/DATA(5))-DATA(7))/
         1 DATA (9)
          IVAR = 3
          CALL CHECK (IVAR, FTAR, FLAG)
          FFLAG=FLAG
C
C         STORE FEED TARGET
          IND=0
          CALL PUTV (-2005,FTAR, IND)
          IF (FFLAG-1) 93,76,76
76        IF (IHARD) 93,78,93
78        JHARD=1
          GO TO 54
C         BACK CALCULATE TEMP. TARGET
68        TTAR=VTAR*DATA(10)/DATA(8)*(DATA(9)*DATA(6)+DATA(7))/DATA(5)
          IVAR=4
          CALL CHECK (IVAR, TTAR,FLAG)
          TFLAG=FLAG
C
C         STORE TEMP. TARGET
```

{ COMMON TO FEED AND TEMPERATURE CONTROL }

```
        IND=0
        CALL PUTV (-2006,TTAR, IND)
        IF (TFLAG-1) 93,96,96
96      IF (IHARD)  98,93,98
98      JHARD=0
        GO TO 54
93      CALL VIAQ
        END
```

As can be seen from the above program, the percentage load for each of these three parameters is calculated by dividing the current condition of that parameter (e.g. the current Quench Tower top temperature stored at Data (3) by the maximum allowable for that parameter (e.g. the value 115° F of XMAX (1)) and multiply the result by 100. The percent load obtained for each one of these parameters is compared with the others and the highest one is XLOAD.

The next step is to calculate the velocity available (VAVL) or the amount the actual velocity can be changed through adding additional steam to the furnace and at the same time refraining from overloading the restrictions. The velocity available (VAVL) is calculated by first substracting the highest percent load from 100 percent. Since for the steam flow control case the highest percent load (XLOAD) is calculated from plant restrictions dependent primarily upon steam flow, namely the quench tower and the inlet steam valve conditions, and since only steam is added or reduced to change the outlet velocity, the percent capacity available must be adjusted for the fraction of steam in the outlet gas before it can be applied as the percent capacity available in outlet velocity. This is done by multiplying the available capacity by the ratio of steam volume to the total gas volume in the furnace outlet. Thus, as shown in function box 63, $$VAVL = (100 - XLOAD) [S/(FE + S)]$$

The available capacity (VAVL) now represents the amount of steam that can be added or reduced without violating one of the plant restrictions. The maximum outlet velocity possible VMAX is now calculated by adding the available capacity VAVL to the actual outlet velocity VEL (function box 64). If the equipment is operating over capacity when this calculation is made, then the velocity available (VAVL) will be a negative number and VMAX will be smaller than the actual outlet velocity (VEL).

Now that the maximum outlet velocity (VMAX) has been calculated, it is possible to calculate the velocity target (VTAR) that will be implemented on this control cycle. This is done in function box 65 by comparing the maximum outlet velocity (VMAX) with the operator set target (DATA (11)). If VMAX is less than the operator set target, then the outlet velocity target for this cycle is set equal to VMAX (function box 66). This means that the physical restrictions at the plant are limiting to the extent that the operator set target cannot be reached. This is an acceptable mode of operation since the best furnace performance occurs when the furnace is operating at maximum outlet velocity. If the operator set target is less than VMAX, then the velocity target (VTAR) is set equal to the operator set target (function box 67).

Having determined the velocity target (VTAR) for this pass, the program now calls a subroutine called CHECK (function box 68) to determine whether or not this new outlet velocity target violates any of three system parameters; namely, the maximum velocity change per pass, the maximum outlet velocity or the minimum outlet velocity. The maximum value constitutes a safely high limit condition, and the minimum value is a value which indicates that any lesser value is due to erroneous data or hardware errors. The current value (CUR), maximum value (MAX), minimum value (MIN), and maximum change (DELTA) of the variable being checked (in this case, velocity) are stored on bulk storage. These values, which were stored there when the system was initiated, can be changed by the operator. The subroutine CHECK identifies the correct data from IVAR, and brings that data into core storage of the computer from the bulk storage area of the disk. The following functions are then accomplished by the subroutine CHECK.

1. The velocity target (VTAR) is substracted from the current value for the velocity (CUR) and the absolute value of that difference is compared with DELTA. If the absolute value of the difference is greater than DELTA, then the velocity target (VTAR) is set equal to CUR + DELTA for VTAR > CUR and CUR − DELTA for VTAR < CUR.

2. The velocity target (VTAR) is compared with MAX. If VTAR is greater than MAX then VTAR is set equal to MAX and FLAG is set equal to two.

3. The velocity target (VTAR) is compared with MIN. If VTAR is less than MIN, then VTAR is set equal to MIN and FLAG is set equal to one.

In making these comparisons, if no violation occurs or if the maximum change per pass is violated, then flag will be set equal to zero.

Now that an acceptable outlet velocity target has been devloped, it is possible to calculate the steam inlet volume target STAR needed to move the outlet velocity to the new target value. This is calculated using the formula indicated in function box 69 of the flow diagram of FIG. 9, and is derived by back calculating steam from the equation earlier used to calculate the outlet velocity. Having calculated a steam target (STAR), the program again calls the subroutine CHECK (function box 70) which obtains system parameters for steam from bulk storage and makes the same comparisons made for the outlet velocity target to determine whether the new steam target violates the system parameters for steam, namely, a maximum steam change per pass, a maximum steam volume and a minimum steam volume. Again FLAG is set equal to 0, 1 or 2 depending on whether or not a violation has occurred, and if a violation occurs STAR is changed to an amount that is possible without violating any system parameters.

The final step (function box 71) is to store the steam target on disk for the control program. This is done by using a subroutine called PUTV. PUTV is the same as GETV except that the data is taken from core storage to the disk storage unit. The parameters are the same as those used by GETV. In this case IVAR is set equal to location −2004, VAL is set equal to STAR, and IND is set equal to zero. Next it must be determined if it is possible to control the outlet velocity within its maximum and minimum limits by varying steam. If it is not possible then the feed volume or outlet temperature will next be varied to control the outlet velocity.

Figure 10B:
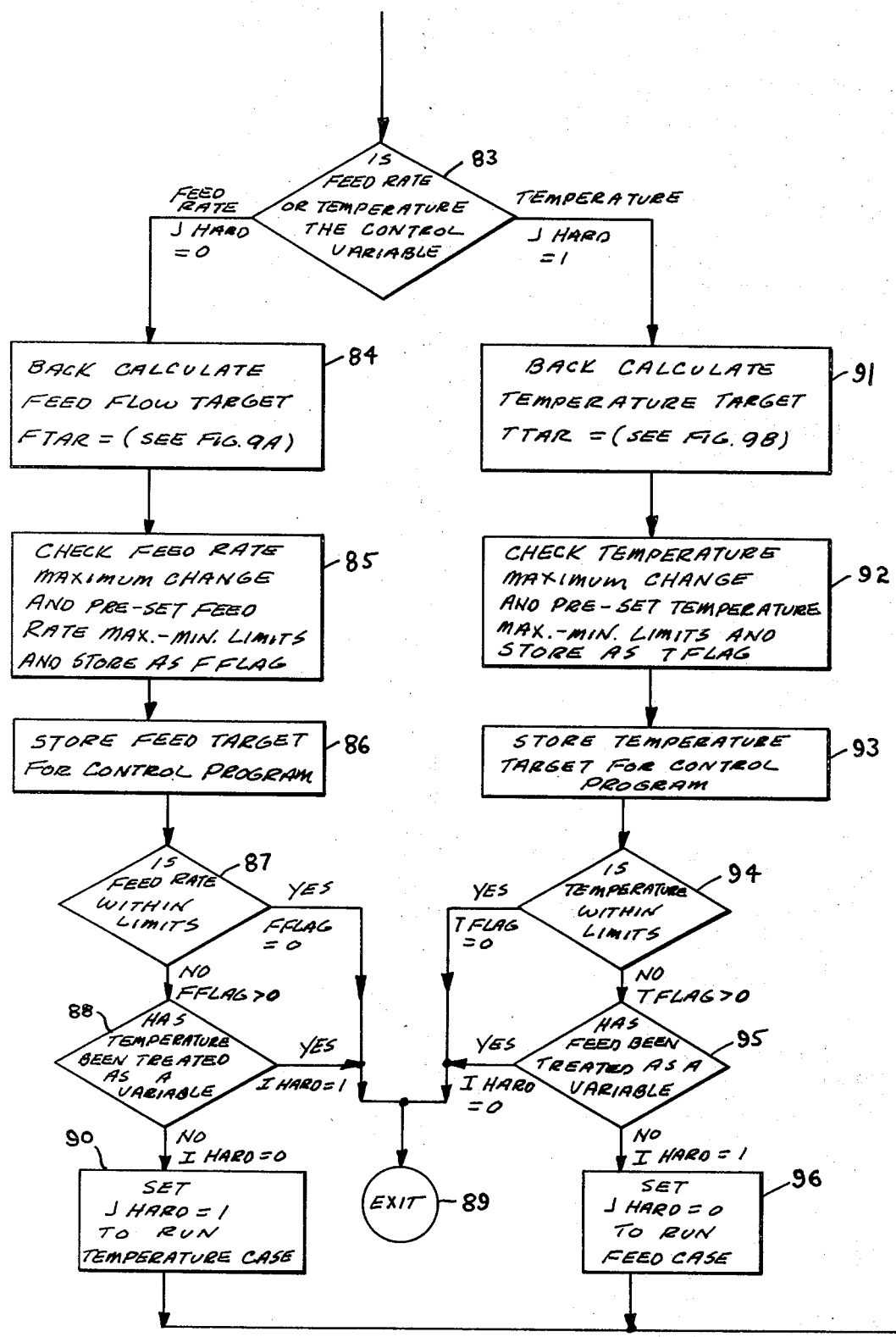

Refer now to FIG. 10. To make this test SFLAG is tested at function box 72. If the change in SFLAG needed to obtain the desired VTAR causes the steam volume to violate the limits for that variable, then it is highly unlikely that the outlet velocity can be controlled with steam. Therefore a branch is made to 46 (function box 73) where the feed or temperature variables go into effect. If SFLAG is equal to zero signifying the change in steam is possible, then VFLAG is tested at function box 74. If VFLAG is also equal to zero signifying the outlet velocity is in bounds, then it is concluded that the outlet velocity is under control by only varying steam and the program is turned off at function box 75 by calling VIAQ. A control program in the IBM-1800 will then pick up the new value of STAR and sends a set point change to the steam motor valve flow controller 28 as shown in FIGS. 5 and 8. This opens or closes the steam motor valve as necessary to change the inlet steam volume to the value desired thus completing the cycle. If steam were the only controlled parameter, then the program would have been turned off at function box 75A in FIG. 9, and the SFLAG and VFLAG checks at 72 and 74 would not be necessary.

When it is time for the next cycle to occur the effect of this steam change will have been reflected in the outlet velocity and it can be determined if another change is needed. If VFLAG is not equal to zero, signifying that the outlet velocity is not being controlled sufficiently by steam changes, then the program branches to 46 (function box 73) where the feed or temperature variable goes into effect, again as shown in FIG. 10.

If in a system where outlet velocity is to be controlled by controlling only one of the variables, steam feed rate, hydrocarbon feed rate or outlet temperature, and instead of automatically controlling steam as shown in FIG. 5 it is desired to automatically control hydrocarbon feed rate as shown in FIG. 6, then the programmed flow chart of FIG. 9 would be changed in only a minor way. This change would consist of substituting function box 63AB for function box 63 because the velocity available VAVL is calculated on a slightly different basis as explained hereinafter, and function box 69A of FIG. 9A would replace function box 69 since the back calculation would be for feed gas flow target rather than for steam flow target.

Similarly, if it were desired to automatically control only outlet temperature as shown in FIG. 7, then the programmed flow chart of FIG. 9 would be changed by again substituting function box 63AB for function box 63, and function box 69B of FIG. 9B would replace function box 69 since the back calculation would be for outlet temperature target rather than for steam flow target.

The system has been developed to first vary steam to meet the outlet velocity target because this has the added benefit of keeping the maximum steam volume on the furnace for a given feed volume and outlet temperature. When it is not possible to control the outlet velocity by varying only the steam volume then either the hydrocarbon feed volume or outlet temperature must be varied. The parameter IHARD is used to determine which of these variables to vary first. IHARD would be changed from the operator's console on the IBM 1800 computer system giving the operator the ability to determine or to change which variable, hydrocarbon feed or temperature, to vary next. If IHARD is equal to zero then the hydrocarbon feed is varied after steam and if IHARD is not equal to zero then the temperature is varied after the steam. The parameter JHARD is set equal to IHARD and is used in the test since its value is changed to complete the logic involved. For illustrative purposes, as shown in the program, it is assumed that IHARD is set equal to zero and that the hydrocarbon feed is varied next, although it is to be understood that the choice could just as well have been to first vary outlet temperature.

Control of Outlet Velocity by Varying the Hydrocarbon Feed

This case is very similar to the steam case. The percent load on the furnace equipment that would be effected by a change in the hydrocarbon feed inlet volume to the furnace is determined. The possible factors which could be affected in this situation would be the tube skin temperature (outside of the cracking tube), the tube hanger temperature, the furnace stack temperature, the furnace stack draft, the temperature on the outlet of the transfer line heat exchanger, and fuel motor value position. The program calculates the percent load on each of these pieces of equipment, and then determines which of these restrictions is most heavily loaded and stores the percent load on that piece of equipment in XLOAD (function box 76). In calculating the percent load on each piece of equipment it is assumed that the maximum value is determined for each restriction, and is stored at XMAX (4) to XMAX (9). While the program does not show setting XMAX (4) to XMAX (9) to preset values it is obvious that they are set to limits determined by the operator and the system limitations in the same manner as XMAX (1), XMAX (2) and XMAX (3) were set in the program portion which relates to steam control. The limitations XMAX ( ) are representative only and other limiting parameters may be used.

The next step is to calculate the velocity available (VAVL) or the amount the actual velocity can be changed through adding additional hydrocarbon feed to the furnace and at the same time refraining from overloading the restrictions. This is shown at function box 77 where the velocity available (VAVL) is calculated by first subtracting the highest percent load from 100 percent to determine the percent available. This is then multiplied by the actual velocity (VEL) to obtain the velocity available. It is not necessary to adjust for the fraction of hydrocarbon feed as it was for steam since the effect on the restrictions is the same in adding hydrocarbon feed or steam. Thus $$VAVL = (100 - XLOAD)VEL$$

The available capacity (VAVL) now represents the amount of hydrocarbon feed that can be added or reduced without violating one of the plant restrictions.

The maximum outlet velocity possible (VMAX) is not calculated at function box 78 by adding the available capacity (VAVL) to the actual outlet velocity (VEL). If the equipment is operating over capacity when this calculation is made, then the velocity available (VAVL) will be a negative number and VMAX will be smaller than the actual outlet velocity (VEL).

Now that the maximum outlet velocity (VMAX) has been calculated, it is possible to calculate the velocity target (VTAR) that will be implemented on this control cycle. This is done at function box 79 by comparing the maximum outlet velocity (VMAX) with the operator set velocity target DATA (11)). If VMAX is less than the operator set target, then the outlet velocity target for this cycle is set equal to VMAX, as at function box 80. This means that the physical restrictions at the plant are limiting to the extent that the operator set target cannot be reached. This is an acceptable mode of operation since the best furnace performance occurs when the furnace is operating at maximum outlet velocity. If the operator set target is less than VMAX, then the velocity target (VTAR) is set equal to the operator set target, as at function box 81.

Having determined the velocity target (VTAR) for this pass the program now calls a subroutine at function box 82 called CHECK to determine whether or not this new outlet velocity target violates any of three system parameters; namely the maximum velocity change per pass, the maximum outlet velocity or the minimum outlet velocity. The maximum value constitutes a safety high limit condition, and the minimum value is a value which indicates that any lesser value is due to erroneous data or hardware errors. The current value (CUR), maximum value (MAX), minimum value (MIN), and maximum change (DELTA) of the variable being checked (in this case, velocity) are stored on bulk storage. These values, which were stored there when the system was initiated, can be changed by the operator. The subroutine CHECK identifies the correct data from IVAR, and brings that data into core storage from the bulk storage area. The following functions are then accomplished by the subroutine CHECK.

1. The velocity target (VTAR) is subtracted from the current value for the velocity (CUR) and the absolute value of that difference is compared with DELTA. If the absolute value of that difference is greater than DELTA, then the velocity target (VTAR) is set equal to CUR + DELTA for VTAR > CUR and CUR − DELTA for VTAR < CUR.

2. The velocity target (VTAR) is compared with MAX. If VTAR is greater than MAX then VTAR is set equal to MAX, and FLAG is set equal to two.

3. The velocity target (VTAR) is compared with MIN. If VTAR is less than MIN, then VTAR is set equal to MIN, and FLAG is set equal to one.

In making these comparisons, if no violation occurs or if the maximum change per pass is violated, then FLAG will be set equal to zero.

At this point JHARD is tested at function box 83 to determine whether Feed Rate or temperature is the variable. For JHARD = 0 Feed Rate is the variable and the program continues to statement 61, For JHARD = 1 the program branches to statement 68 treating temperature as the variable.

Now that an acceptable outlet velocity target has been developed and it has been decided that Feed Rate is the variable, it is possible to calculate the hydrocarbon feed inlet volume target FTAR needed to move the outlet velocity to the new target value. This is calculated at function box 84 using the following formula which is derived by back calculating the hydrocarbon feed from the equation used earlier to calculate the outlet velocity.

$$FTAR = \left[ \frac{VEL\ (A_o + A_{oe} - A_{oo})}{0.00769\ \frac{T_o}{P_o}} - S \right] \frac{1}{E}$$

Having calculated a hydrocarbon feed target (FTAR), the program again calls the subroutine CHECK at function box 85, disk address IVAR = 3, which obtains system parameters for feed from bulk storage and makes the same comparisons made for the outlet velocity target to determine whether the new feed target violates the system parameters for feed, namely, a maximum feed change per pass, a maximum feed volume and a minimum feed volume. Again FLAG is set equal to 0, 1 or 2 depending on whether or not a violation has occurred. If a violation occurs FTAR is changed to an amount that is possible without violating any system parameters. Where there is no violation, or the maximum change per pass is violated, the Flag remains at zero.

The final step is to store the feed target on disk for the control program. This is done at function box 86 by using a subroutine called PUTV. PUTV is the same as GETV except that the data is taken from core storage to the disk storage unit. the parameters are the same as those used by GETV. In this case IVAR is set equal to location −2005, VAL is set equal to FTAR, and IND is set equal to zero.

Next it must be determined if it is possible to control the outlet velocity within its maximum and minimum limits by varying feed. If it is not possible and if JHARD = 0 then the outlet temperature is varied to control the outlet velocity. To make the test FFLAG is tested at function box 87. If the change in FFLAG needed to obtain the desired VTAR causes the feed rate to violate the limits for that variable, then it is highly unlikely that the outlet velocity can be controlled with feed. Therefore a branch is made at 76 to function box 88 where either the temperature variable goes into effect or the program is turned off depending on whether the temperature variable has been previously considered or not. If FFLAG is equal to zero signifying the change in feed is possible, then the program is turned off at function box 89 by calling VIAQ. A control program in the IBM-1800 picks up the new value of FTAR and sends a set point change to the feed motor valve flow controller 19 as shown in FIGS. 6 and 8. This opens or closes the feed motor valve as necessary to change the inlet feed volume to the value desired thus completing the cycle. When it is time for the next cycle to occur the effect of this feed change will have been reflected in the outlet velocity and it can be determined if another change is needed.

If FFLAG is not equal to zero, signifying that the outlet velocity is not being controlled sufficiently, then the program branches to 76 when IHARD is tested. For IHARD equal to zero, which is true for this illustration, the program then sets JHARD = 1 at function box 90 and branches to 54 causing the program to return to function box 76 to make another pass by changing temperature rather than feed or steam. For IHARD = 1 the program branches to 93 where it is turned off at function box 89 since the temperature case would have already been considered.

Control of Outlet Velocity by Varying the Outlet Temperature

Consider now the case where JHARD is set equal to 1 (after the hydrocarbon feed program was executed) and temperature is the variable used to control the velocity.

This situation is the same as the hydrocarbon feed case in that the common portion of the routine is again executed through function boxes 76 to 82. Thereafter, when JHARD is again tested at function box 83 and found equal to one, the program jumps to line 68 and the temperature target is calculated.

The outlet temperature target TTAR needed to move the outlet velocity to the new target value is calculated at function box 91 using the following formula, which is derived by back calculating the outlet temperature from the equation used earlier to calculate the outlet velocity.

$$TTAR = T_o = VEL\ (A_o + A_{oe} - A_{oc})/[0.00769(EF + S)/P_o]$$

Having calculated a temperature target (TTAR), the program again calls the subroutine CHECK at function box 92, whose disk address is IVAR = 4, which obtains system parameters for temperature from bulk storage and makes the same comparisons made for the outlet velocity target to determine whether the new temperature target violates the system parameters for temperature, namely a maximum temperature change per pass, a maximum temperature and a minimum temperature.

The final step is to store the temperature target on disk for the control program. This is done at function box 93 by using a subroutine called PUTV. In this case IVAR is set equal to location −2006, VAL is set equal to TTAR, and IND is set equal to zero. Next it must be determined if it is possible to control the outlet velocity within its maximum and minimum limits by varying outlet temperature. If it is not possible then the feed is varied to control the outlet velocity. To make the test TFLAG is tested at fucntion box 94. If the change in TFLAG needed to obtain the desired VTAR causes outlet temperature to violate the limits for that variable, then it is highly unlikely that the outlet velocity can be controlled with temperature. Therefore a program branch is made to statement 96 at function box 95 where either the hydrocarbon feed variable goes into effect or the program is turned off depending on whether the feed variable was previously considered or not. In the case where the feed rate has not been previously considered (IHARD = 1) the program goes to statement 98 where JHARD is set equal to zero allowing the program to go through the feed case and the program branches back to statement 54. If the feed case was considered (IHARD = 0) then the program is turned off at function box 89 by branching to statement 93, since nothing more can be done on this pass. If TFLAG is equal to zero signifying the change in temperature is possible then the program is turned off at function box 89 by calling VIAQ.

A control program in the IBM-1800 will then pick up the new value of TTAR and send a set point change to the outlet temperature controller. This in turn opens or closes the fuel motor valve 33 as shown in FIGS. 7 and 8, thus heating or cooling the furnace as necessary to change the outlet temperature to the desired value, thus completing the cycle. When it is time for the next cycle to occur the effect of this temperature change will be reflected in the outlet velocity and it can be determined if another change is needed.

The foregoing target equations, whether for steam, hydrocarbon feed gas or conversion (outlet temperature), are all of the general form.

$$WTAR = X\left[\frac{VEL\ (A_o + A_{oe} - A_{oo})}{Y\left(\frac{.00769}{P_o}\right)} - Z\right]$$

Where, when

| W=S (steam) | W=F (feed gas) | W=T (outlet temp.) |
|---|---|---|
| X=1 | X=1/E | X=1 |
| Y=To | Y=To | Y=FE+S |
| Z=FE | Z=S | Z=0 |

What is claimed is:

1. A method of operating a hydrocarbon cracking furnace system to minimize residence time of hydrocarbon feed gas passing therethrough by controlling the gas velocity at the cracking furnace outlet, consisting of the steps of,
   a. setting controllers for initial feed condition of input material which is to pass through the cracking furnace, for system operating parameters and for desired target outlet velocity,
   b. monitoring the flow of input material and selected system parameters by means of which the furnace outlet gas velocity is determinable,
   c. generating a representation of the outlet gas velocity from the aforesaid monitored conditions,
   d. generating a representation of maximum possible outlet velocity,
   e. comparing the representation of maximum possible outlet velocity with a representation of operator desired target outlet volocity,
   f. setting target outlet velocity to operator desired target outlet velocity if the maximum possible outlet velocity is larger than operator desired target outlet velocity, and setting target outlet velocity to the maximum possible outlet velocity if the maximum possible outlet velocity is smaller than operator desired target outlet velocity,
   g. selecting a system operating parameter or flow of input material for control and selecting the target value for the selected system operating parameter or flow of input material, and setting the controller therefor to target value.

2. The method of operating a hydrocarbon cracking furnace system as set forth in claim 1 wherein said steps *a* through *g* are iterated at predetermined time intervals.

3. The method of operating a hydrocarbon cracking furnace system as set forth in claim 1 wherein at least a part of the input material to the furnace is steam, and the gas velocity at the cracking furnace outlet is controlled by controlling the flow of steam.

4. The method of operating a hydrocarbon cracking furnace system as set forth in claim 1 wherein at least a part of the input material to the furnace is hydrocarbon feed gas and the gas velocity at the cracking furnace outlet is controlled by controlling the flow of hydrocarbon feed gas.

5. The method of operating a hydrocarbon cracking furnace system as set forth in claim 1 wherein at least one of the monitored system parameters is furnace outlet gas temperature and the gas velocity at the cracking furnace outlet is controlled by controlling the furnace outlet gas temperature.

6. The method of operating a hydrocarbon cracking furnace system as set forth in claim 1 wherein the flow target for said input material was controlled in step g, and further consisting of the steps of determining whether said flow target can be achieved, selecting a system operating parameter target if said flow target cannot be achieved, and setting a controller to the target for said system operating parameter.

7. The method of operating a hydrocarbon cracking furnace system as set forth in claim 1 wherein said input material comprises hydrocarbon feed gas and another input material, and further comprising the steps of determining whether the target of the controlled input or system operating parameter can be achieved, choosing one of the targets not previously controlled in step g to be next selected if the target previously selected in step g cannot be achieved, and setting the corresponding controller to the new target.

8. The method of operating a hydrocarbon cracking furnace system as set forth in claim 1 wherein said input material comprises hydrocarbon feed gas and another input material, and further comprising the steps of determining whether the target of the controlled input or system operating parameter can be achieved, choosing one of the targets not previously controlled in step g to be next selected if the target previously selected in step g cannot be achieved, setting the corresponding controller to the new target, the steps of choosing a target not yet controlled to be next selected if the target last selected cannot be achieved, and setting the corresponding controller to the target just selected.

9. The method of operating a hydrocarbon cracking furnace system as set forth in claim 1 wherein said input material comprises hydrocarbon feed gas and another input material, and further comprising the steps of choosing a target not yet controlled to be next selected if the target last selected cannot be achieved and setting the corresponding controller to the target just selected.

10. The method of operating a hydrocarbon cracking furnace system as set forth in claim 1 wherein said input material comprises hydrocarbon feed gas and another input material, the input material is controlled in step g and is hydrocarbon feed gas, and further comprising the steps of, determining whether the feed gas flow target can be achieved, choosing whether, said another input material or one of said system operating parameters is to be controlled if the feed gas flow target cannot be achieved, and selecting the target for said another input material or said system operating parameter, whichever has been chosen, and setting the corresponding controller to the target.

11. The method of operating a hydrocarbon cracking furnace system as set forth in claim 1 wherein said input material comprises steam and hydrocarbon feed gas, the input material is controlled in step g and is steam, and further comprising the steps of, determining whether the steam flow target can be achieved, choosing whether feed gas or one of said system operating parameters is to be controlled if the steam flow target cannot be achieved, and selecting the target for feed gas or said system operating parameter, whichever has been chosen, and setting the corresponding controller to the target.

12. A method of operating a hydrocarbon cracking furnace system to minimize residence time of hydrocarbon feed gas passing therethrough by controlling the gas velocity at the cracking furnace outlet, consisting of the steps of,
   a. setting controllers for initial feed condition of input material which is to pass through the cracking furnace, for system operating parameters and for desired target outlet velocity,
   b. monitoring the flow of input material and selected system parameters by means of which the furnace outlet gas velocity is determinable,
   c. generating a representation of the outlet gas velocity from the aforesaid monitored conditions,
   d. generating a representation of the highest percent loading on the system from the monitored selected system parameters,
   e. generating a representation of the incremental velocity available in the system for the flow of said input material or for said system operating parameters to be controlled,
   f. generating a representation of maximum possible outlet velocity,
   g. comparing the representation of maximum possible outlet velocity with a representation of operator desired target outlet velocity,
   h. setting target velocity to operator desired target outlet velocity if the maximum possible outlet velocity is larger than operator desired target outlet velocity, and setting target outlet velocity to the maximum possible outlet velocity if the maximum possible outlet velocity is smaller than operator desired target outlet velocity,
   i. selecting a system operating parameter or flow of input material for control and selecting the target value for the selected system operating parameter or flow of input material, and setting the controller therefor to target value, and
   j. iterating steps a through i at predetermined time intervals.

13. The method of operating a hydrocarbon cracking furnace system as set forth in claim 12 wherein the cracking furnace system includes a quench tower and a steam valve and at least some of the selected system parameters monitored are the quench tower top temperature, the quench tower differential pressure and the steam valve position, and the highest percent loading on the system is selected from among the largest of the percent loadings of the aforesaid monitored parameters wherein each percent loading is defined as the ratio of the monitored parameter value divided by the maximum allowable monitored parameter value.

14. The method of operating a hydrocarbon cracking furnace system as set forth in claim 12 wherein the cracking furnace system includes a furnace having a cracking tube supported by tube hangers and a combustion stack, a transfer line heat exchanger and a furnace fuel feed control, and at least some of the selected system parameters monitored are the temperatures of the cracking tube skin and cracking tube hangers and combustion stack and transfer line heat exchanger outlet, the furnace stack draft, and the furnace fuel feed control, and the highest percent loading on the system is selected from among the largest of the percent loadings of the aforesaid monitored parameters wherein each percent loading is defined as the ratio of the monitored parameter value divided by the maximum allowable monitored parameter value.

15. The method of operating a hydrocarbon cracking furnace system as set forth in claim 12 wherein at least a part of the input material to the furnace is steam and wherein the said step of generating a representation of the incremental velocity available in the system consists of generating said representation of said incremental velocity available by controlling steam flow.

16. The method of operating a hydrocarbon cracking furnace system as set forth in claim 12 wherein at least a part of the input material to the furnace is hydrocarbon feed gas and said step of generating a representation of the incremental velocity available in the system consists of generating said representation of said incremental velocity available by controlling the flow of hydrocarbon feed gas.

17. The method of operating a hydrocarbon cracking furnace system as set forth in claim 12 wherein at least one of the monitored system parameters is furnace outlet gas temperature and said step of generating a representation of the incremental velocity available in the system consists of generating said representation of said incremental velocity available by controlling the furnace outlet gas temperature.

18. The method of operating a hydrocarbon cracking furnace system as set forth in claim 13 wherein at least a part of the input material to the furnace is steam and wherein the said step of generating a representation of the incremental velocity available in the system consists of generating said representation of said incremental velocity available by controlling steam flow.

19. The method of operating a hydrocarbon cracking furnace system as set forth in claim 14 wherein at least a part of the input material to the furnace is hydrocarbon feed gas and said step of generating a representation of the incremental velocity available in the system consists of generating said representation of said incremental velocity available by controlling the flow of hydrocarbon feed gas.

20. The method of operating a hydrocarbon cracking furnace system as set forth in claim 14 wherein at least one of the monitored system parameters is furnace outlet gas temperature and said step of generating a representation of the incremental velocity available in the system consists of generating said representation of said incremental velocity available by controlling the furnace outlet gas temperature.

21. A method of operating a hydrocarbon cracking furnace system to minimize residence time of hydrocarbon feed gas passing therethrough by controlling the gas velocity at the cracking furnace outlet, consisting of the steps of,
   a. setting controllers for initial conditions of feed gas flow, steam flow, furnace temperature, and determining desired target outlet velocity,
   b. monitoring furnace outlet gas temperature ($T_o$) and pressure ($P_o$), hydrocarbon feed rate (F), steam feed rate (S), and the molecular weights of the outlet and feed gases, and other selected system parameters,
   c. generating a representation of the outlet gas velocity from the monitored data in accordance with the equation.

$$VEL = [0.00769 \, (T_o/P_o) \, (FE + S)]/(A_o + A_{oe} - A_{oc})$$

Where:

$$E = \frac{\text{molecular weight of outlet gas}}{\text{molecular weight of feed gas}}$$

$A_o$ = measured outlet area at preselected temperature $A_{oe}$ = change in outlet area due to expansion $A_{oc}$ = change in outlet area due to coke build-up d. generating a representation of the highest percent loading on the system from the monitored selected system parameters in accordance with the general expression $$X\text{Load} = \frac{\text{Monitored parameter value}}{\text{Max allowable monitored parameter value}} \cdot 100$$

e. generating a representation of the incremental velocity available in the system for the steam, feed gas or outlet temperature to be controlled in accordance with the general expression $$(W)VAVL = (100 - X\text{Load})K$$

Where, when

| W=S(Steam) | W=F(FeedGas) or T(Outlet temp.) |
|---|---|
| K=S/FE+S | K=VEL | f. generating a representation of maximum possible outlet velocity from $$VMAX = VEL + VAVL$$

g. comparing the representation of VMAX with a representation of operator desired target outlet velocity,
   h. setting target outlet velocity to operator desired target outlet velocity if VMAX is larger than operator desired target outlet velocity, and setting target outlet velocity to VMAX if VMAX is smaller than operator desired target outlet velocity,
   i. selecting the flow target for steam, feed gas or outlet gas temperature, whichever is to be controlled, from the expression $$(W)TAR = X \left[ \frac{VEL(A_o + A_{oe} - A_{oc})}{Y\left(\frac{.00769}{P_o}\right)} - Z \right]$$

Where, when

| W=S (steam) | W=F(feed gas) | W=T(outlet temp.) |
|---|---|---|
| X=1 | X=1/E | X=1 |
| X=$T_o$ | Y=$T_o$ | Y=FE+S |
| Z=FE | Z=S | Z=0 | and setting said controller to target value.

22. The method of operating a hydrocarbon cracking furnace system as set forth in claim 21 wherein the gas velocity at the cracking furnace outlet is controlled by controlling the flow of steam.

23. The method of operating a hydrocarbon cracking furnace system as set forth in claim 21 wherein the gas velocity at the cracking furnace outlet is controlled by controlling the flow of feed gas.

24. The method of operating a hydrocarbon cracking furnace system as set forth in claim 21 wherein the gas velocity at the cracking furnace outlet is controlled by controlling furnace outlet temperature.

25. The method of operating a hydrocarbon cracking furnace system as set forth in claim 21 wherein said steps *a* through *i* are iterated at predetermined time intervals.

26. The method of operating a hydrocarbon cracking furnace system as set forth in claim 21 wherein the flow target for steam has been controlled in step i and further comprising the steps of, determining whether the steam flow target can be achieved, choosing whether feed gas or outlet gas temperature is to be controlled if the steam flow target cannot be achieved, and selecting the target for feed gas or outlet gas temperature, whichever has been chosen, and setting the corresponding controller to the target.

27. The method of operating a hydrocarbon cracking furnace system as set forth in claim 21 wherein the flow target for steam has been controlled in step i) and further comprising the steps of, determining whether the steam flow target can be achieved, choosing whether feed gas or outlet gas temperature is to be controlled if the steam flow target cannot be achieved, and selecting the target for feed gas or outlet gas temperature, which ever has been chosen, setting the corresponding controller to the target just chosen, choosing the target which has not yet been controlled to be the target next selected if the target last selected cannot be achieved, and setting the corresponding controller to the target just selected.

28. The method of operating a hydrocarbon cracking furnace system as set forth in claim 27 wherein the sequence of steps set forth therein is iterated at predetermined time intervals.

29. A method of operating a hydrocarbon cracking furnace system to minimize residence time of hydrocarbon feed gas passing therethrough by controlling the gas velocity at the cracking furnace outlet, consisting of the steps of,
   a. setting controllers for initial feed condition of input material which is to pass through the cracking furnace, for system operating parameters and for desired target outlet velocity,
   b. monitoring the flow of input material and selected system parameters by means of which the furnace outlet gas velocity is determinable,
   c. generating a representation of the outlet gas velocity from the aforesaid monitored conditions,
   g. generating a representation of maximum possible outlet velocity,
   e. comparing the representation of maximum possible outlet velocity with a representation of operator desired target outlet velocity,
   f. setting target outlet velocity to operator desired target outlet velocity if the maximum possible outlet velocity is larger than operator desired target outlet velocity, and setting target outlet velocity to the maximum possible outlet velocity if the maximum possible outlet velocity is smaller than operator desired target outlet velocity,
   g. selecting the flow target for said input material, and setting said controller to target value.

30. A method of operating a hydrocarbon cracking furnace system to minimize residence time of hydrocarbon feed gas passing therethrough by controlling the gas velocity at the cracking furnace outlet, consisting of the steps of,
   a. setting controllers for initial feed condition of input material which is to pass through the cracking furnace, for system operating parameters and for desired target outlet velocity,
   b. monitoring the flow of input material and selected system parameters by means of which the furnace outlet gas velocity is determinable,
   c. generating a representation of the outlet gas velocity from the aforesaid monitored conditions,
   d. generating a representation of the highest percent loading on the system from the monitored selected system parameters,
   e. generating a representation of the incremental velocity available in the system for the flow of said input material or for said system operating parameters to be controlled,
   f. generating a representation of maximum possible outlet velocity,
   g. comparing the representation of maximum possible outlet velocity with a representation of operator desired target outlet velocity,
   h. setting target outlet velocity to operator desired target outlet velocity if the maximum possible outlet velocity is larger than operator desired target outlet velocity, and setting target outlet velocity to the maximum possible outlet velocity if the maximum possible outlet velocity is smaller than operator desired target outlet velocity,
   i. selecting the flow target for said input material, and setting said controller to target value, and
   j. iterating steps a through i at predetermined time intervals.

31. A hydrocarbon cracking furnace system to minimize residence time of hydrocarbon feed gas passing therethrough by controlling the gas velocity at the cracking furnace outlet, comprising in combination,
   a. a plurality of controllers for controlling the feed of input material which is to pass through the cracking furnace and for setting system operating parameters,
   b. input material monitoring means for monitoring the flow of input material, and system parameter monitoring means for monitoring selected system parameters,
   c. outlet gas velocity determining means coupled to said monitoring means effective to determine the outlet gas velocity from the aforesaid monitored conditions,
   d. means for determining maximum possible furnace outlet velocity,
   e. comparator means for comparing the maximum possible outlet velocity with operator desired target outlet velocity,
   f. target control means responsive to said comparator means and coupled to and effective to operate said plurality of controllers for setting target outlet velocity to operator desired target outlet velocity if the maximum possible outlet velocity is larger than operator desired target outlet velocity, and setting target outlet velocity to the maximum possible outlet velocity if the maximum possible outlet velocity is smaller than operator desired target outlet velocity, said target control means including selection means operative to select which of said plurality of controllers shall be operated to move toward said target outlet velocity.

32. A hydrocarbon cracking furnace system as set forth in claim 31 further including load determining means for determining the highest percent loading on the system from the monitored selected system parameters, and means for determining the incremental velocity available in the system for a change in the flow of said input material or for a change in said system controllable operating parameters.

33. A hydrocarbon cracking furnace system as set forth in claim 31 further including cycling means effective to cause said determining means, said comparator means and said target control means to cyclically carry out their aforesaid functions at predetermined time intervals.

* * * * *